US010559036B2

(12) United States Patent
Higgins et al.

(10) Patent No.: US 10,559,036 B2
(45) Date of Patent: Feb. 11, 2020

(54) COMPUTER IMPLEMENTED INSURANCE SELECTION SYSTEMS AND METHODS

(75) Inventors: Barry Higgins, Westfield, NJ (US);
Teresa M. Hoffman, Austin, TX (US);
Eric L. Major, Salem, NH (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 261 days.

(21) Appl. No.: 12/851,354

(22) Filed: Aug. 5, 2010

(65) Prior Publication Data

US 2012/0035964 A1 Feb. 9, 2012

(51) Int. Cl.
*G06Q 40/08* (2012.01)

(52) U.S. Cl.
CPC .................. *G06Q 40/08* (2013.01)

(58) Field of Classification Search
None
See application file for complete search history.

(56) References Cited

U.S. PATENT DOCUMENTS

| 5,523,942 A * | 6/1996 | Tyler | G06Q 30/04 705/34 |
| 5,754,850 A * | 5/1998 | Janssen | 707/758 |
| 6,189,029 B1 * | 2/2001 | Fuerst | G06Q 30/02 707/999.104 |
| 8,073,714 B1 * | 12/2011 | Ball | 705/4 |
| 2007/0226014 A1 * | 9/2007 | Alemayehu | G06Q 40/08 705/4 |

* cited by examiner

*Primary Examiner* — Scott S Trotter
(74) *Attorney, Agent, or Firm* — Troutman Sanders LLP

(57) ABSTRACT

Disclosed herein are selection systems and methods for selecting a disability insurance package from a plurality of disability insurance packages, and for recommending the selected disability insurance package to a client. A selection system can include a query unit, a scoring unit and a recommendation unit. The query unit can present two or more prompts related to disability insurance, each prompt being associated with two or more response choices. A client can select a response choice for each prompt, and the query unit can receive the selected response choices. The scoring unit can associate point values with each of the selected response choices and can calculate a response score by combining the point values. The recommendation unit can select a disability insurance package corresponding the response score resulting from the user's responses to the prompts. Other embodiments of selection systems are also disclosed herein.

11 Claims, 9 Drawing Sheets

| CURRENT AGE | ANNUAL EARNED INCOME | | | | | |
|---|---|---|---|---|---|---|
| | $40,000 | $60,000 | $80,000 | $100,000 | $120,000 |
| 30 | $853,837 | $1,280,756 | $1,707,674 | $2,134,593 | $2,561,512 |
| 35 | $748,653 | $1,122,979 | $1,497,306 | $1,871,632 | $2,245,959 |
| 40 | $638,313 | $957,470 | $1,276,627 | $1,595,784 | $1,914,940 |
| 45 | $522,566 | $783,849 | $1,045,132 | $1,306,415 | $1,567,699 |
| 50 | $401,146 | $601,719 | $802,292 | $1,002,865 | $1,203,438 |

Fig. 3

| Annual Earned Income | Monthly Earned Income | Maximum Available Monthly Job Loss Benefit (With no Other Disability Coverage) |
|---|---|---|
| 60000 | $5,000 | 3250 |
| 65000 | $5,417 | 3500 |
| 70000 | $5,833 | 3800 |
| 75000 | $6,250 | 4050 |
| 80000 | $6,667 | 4350 |
| 85000 | $7,083 | 4600 |
| 90000 | $7,500 | 4900 |
| 95000 | $7,917 | 5000 |
| 100000 | $8,333 | 5000 |
| 105000 | $8,750 | 5000 |
| 110000 | $9,167 | 5050 |
| 115000 | $9,583 | 5250 |
| 120000 | $10,000 | 5500 |
| 125000 | $10,417 | 5750 |
| 130000 | $10,833 | 5950 |
| 135000 | $11,250 | 6200 |
| 140000 | $11,667 | 6400 |
| 145000 | $12,083 | 6650 |
| 150000 | $12,500 | 6900 |
| 155000 | $12,917 | 7100 |
| 160000 | $13,333 | 7350 |
| 165000 | $13,750 | 7550 |
| 170000 | $14,167 | 7800 |

| | | | |
|---|---|---|---|
| 1. I work in an occupation with primarily hands on manual duties, such as a tradesman, builder, plumber, chef, custodian or any other similar type of manual occupation, or as a chiropractor or podiatrist. | Agree | Unsure | Disagree |
| 2. I prefer a policy with premiums that are not scheduled to increase, rather than one with a lower initial premium that increases each year and eventually costs more. | Agree | Unsure | Disagree |
| 3. I don't want to commit to the expense of a level premium policy today, however I'd like to guarantee the right to buy in in the future should my situation change. | Agree | Unsure | Disagree |

Fig. 5

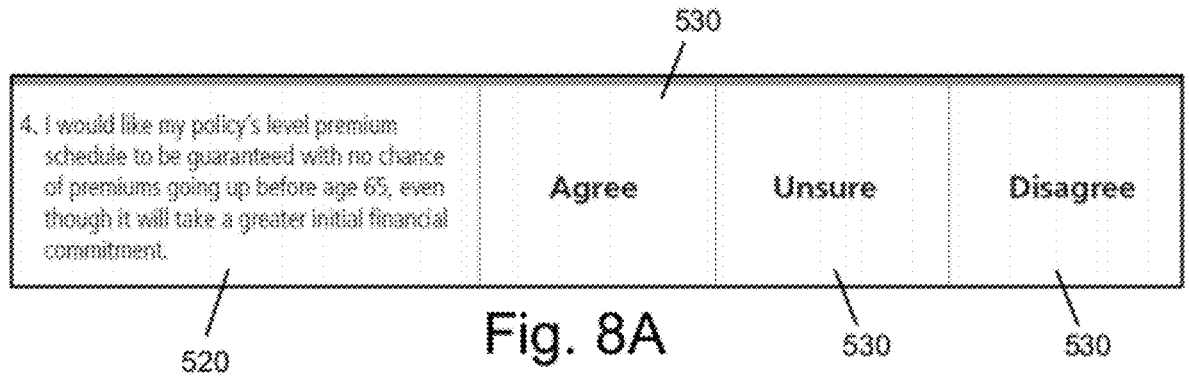
Fig. 8A
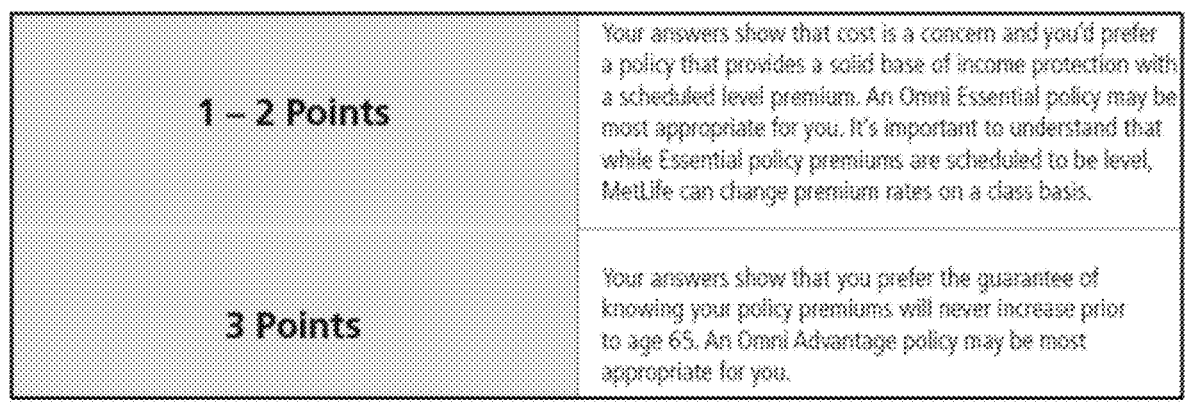
Fig. 8B
Fig. 8C

COMPUTER IMPLEMENTED INSURANCE SELECTION SYSTEMS AND METHODS

TECHNICAL FIELD

Various embodiments of the present invention relate to disability insurance and, more particularly, to systems and methods for selecting a disability insurance package based on scored responses to prompts directed toward discovering a client's preferences regarding disability insurance.

BACKGROUND

The ability to earn an income can enable a person to live a comfortable lifestyle, while saving for future circumstances. Due to illness or injury, however, a person can lose his or her ability to earn an income for a brief or prolonged period of time, which can destroy future plans dependent on continuing income.

While various options exist for supplementing income during a period of disability, many of these options are insufficient for supplementing income over an extended period of disability. For example, while some employers may provide disability insurance, the benefit amount and coverage length of that insurance may be insufficient to meet one's needs. To receive social security a disabled person must meet a strict definition of disability. Worker's compensation is not applicability unless the disability was caused by a workplace incident. Personal, retirement, or education savings or a home equity loan can be quickly depleted and insufficient for longtime needs, and use of these savings can negatively affect future plans. A home equity loan can quickly deplete long sought equity in one's property. A credit card cash advance can impose high interest rates, leading to further financial difficulties in the future. Disability insurance, in contrast to the above options, can guarantee income during a short or long period of disability without negatively impacting a disabled person's future plans. However, the task of identifying an appropriate disability insurance policy can be daunting for those who are unfamiliar with disability insurance.

Therefore, there is a need for an effective means of recommending disability insurance to assist individuals in preparing for the future. In an exemplary embodiment, a disability insurance selection system can provide prompts to a client directed toward identifying an appropriate disability insurance package and can recommend a disability insurance package based on a client's responses to the prompts. It is to such a disability insurance selection system that various embodiments of the present invention are directed.

SUMMARY

Briefly described, various embodiments of the present invention are systems and methods for selecting and recommending disability insurance. A selection system, according to an exemplary embodiment of the present invention, can query a user regarding issues related to disability insurance and can recommend a disability insurance package based on the user's responses to the queries. An exemplary selection system can comprise a query unit, a scoring unit, and a recommendation unit.

The query unit can present to a user two or more prompts related to disability insurance. For each prompt, the query unit can provide two or more response choices from which the user can choose. The user can select his or her desired response choices, which can be received by the query unit.

The scoring unit can be in communication with the query unit and can calculate a response score based on the user's responses to the prompts. Each response choice associated with the prompts can be assigned a point value, and the scoring unit can combine the point values of the selected responses to arrive at the response score. In an exemplary embodiment, for example, the score unit can calculate the response score as the sum of the point values corresponding to the selected response choices.

The recommendation unit can be in communication with the scoring unit and can recommend a disability insurance package to the user based on the user's responses to the presented prompts. The recommendation unit can receive the response score from the scoring unit, and can select one of a plurality of available disability insurance packages as the recommended disability insurance package, based on the response score.

Accordingly, selection system can use the user's responses to the presented prompts to recommend an appropriate disability insurance package. These and other objects, features, and advantages of the present invention will become more apparent upon reading the following specification in conjunction with the accompanying drawings.

BRIEF DESCRIPTION OF THE FIGURES

FIG. 3 illustrates a table depicting expected earned lifetime income for a client seeking an insurance recommendation, according to an exemplary embodiment of the present invention.

FIG. 5 illustrates a form presenting prompts and response choices to the client for recommending a disability insurance package, according to an exemplary embodiment of the present invention.

FIGS. 8A-8C illustrate an additional prompt and analysis of the additional prompt to refine a recommendation of a disability insurance package, according to an exemplary embodiment of the present invention.

DETAILED DESCRIPTION

Figure 1:
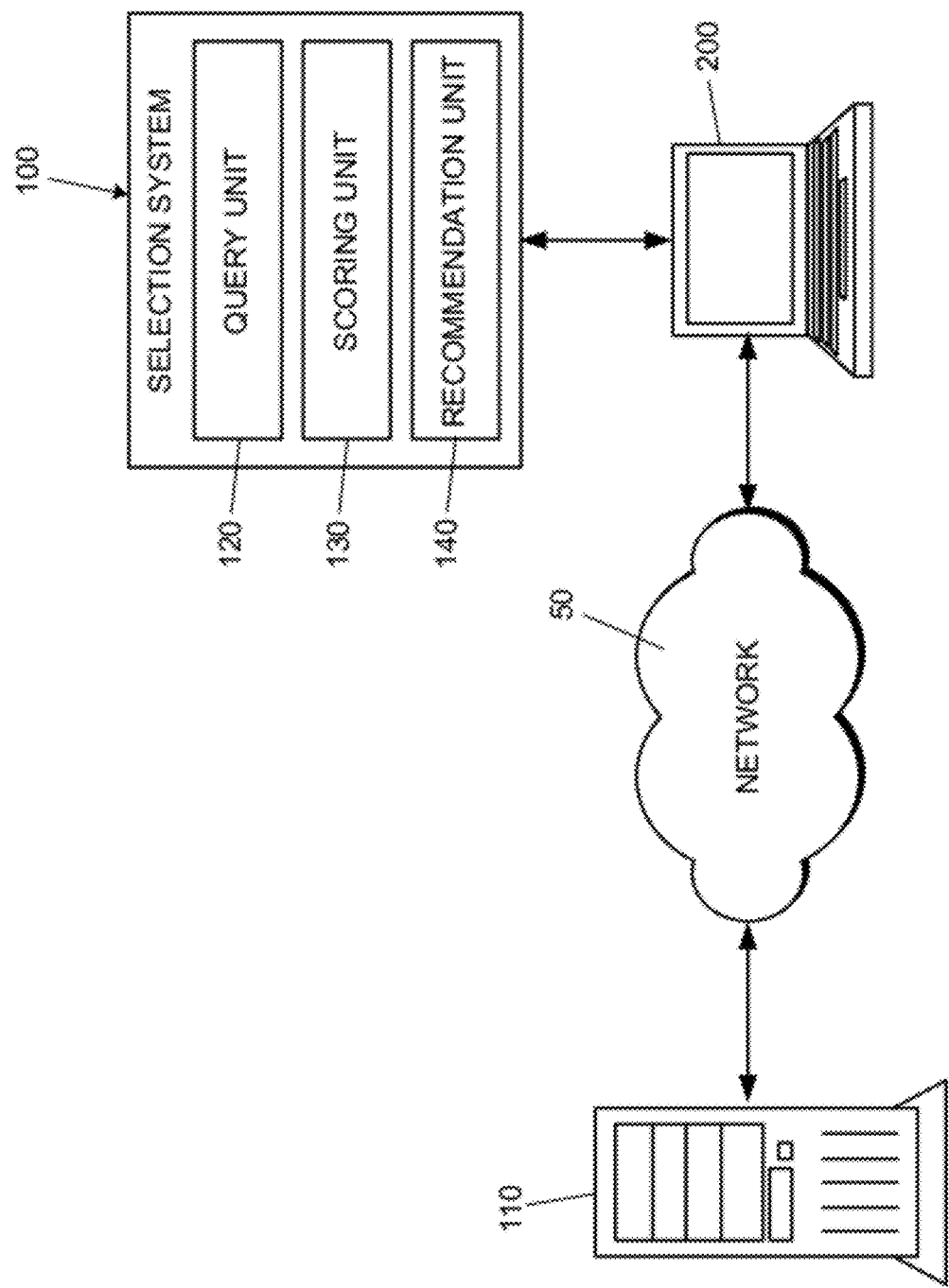
FIG. 1 illustrates a block diagram of a selection system and associated devices, according to an exemplary embodiment of the present invention.

To facilitate an understanding of the principles and features of embodiments of the present invention, those principles and features are explained with reference to their implementation in illustrative embodiments. In particular, embodiments of the invention are described in the context of being selection systems for selecting and recommending disability insurance packages based on a users' responses to presented prompts. Embodiments of the invention, however, are not limited to selecting disability insurance packages. Rather, embodiments of the invention can select other types of insurance products or provide various other types of recommendations.

The components described hereinafter as making up various elements of the invention are intended to be illustrative and not restrictive. Many suitable components that would perform the same or similar functions as the components described are intended to be embraced within the scope of the invention. Such other components can include, for example, components developed after development of the invention.

Referring now to the figures, in which like reference numerals represent like parts throughout the views, disability insurance selection systems and methods will be described in detail.

FIG. 1 illustrates a block diagram of a selection system 100, according to an exemplary embodiment of the present invention. According to some embodiments of the present invention, a selection system 100 can select and recommend a disability insurance package based on the user's responses to one, two, or more prompts related to disability insurance. The selection system 100 can be integrated, in whole or in part, into a computing device 200. The selection system 100 can be in many forms, including a local software application, a remote application accessed by a web client, one or more hardware components, or a combination of these.

If the selection system 100 is implemented as part of a web application, then the selection system 100 can be operated remotely, such as by a server 110. The server 110 can be configured to service a website or otherwise communicate data to be displayed on the computing device 200. In that case, data entered into a user interface of the selection system 100 that is displayed on the computing device 200 can be transmitted back to the server 110 for processing. Accordingly, the computing device 200 and the server 110 can communicate with each other for operation of the selection system 100.

As shown in FIG. 1, the selection system 100 can comprise one or more units for operation of various tasks of the selection system 100. These units of the selection system 100 can be modules, applications, devices, systems, services, or combinations or portions thereof. The units of the selection system 100 can include a query unit 120, a scoring unit 130, and a recommendation unit 140.

Although these units of the selection system 100 are shown, in FIG. 1, as being embodied locally at the computing device 200, if the selection system 100 is operated by the server 110, then one or more of these units 120, 130, and 140 of the selection system 100 can be operated on the server 110. Further, although the units 120, 130, and 140 are depicted as being distinct units of the selection system 100, this need not be the case. Components of the selection system 100, including the query unit 120, the scoring unit 130, and the recommendation unit 140, can be integrated into a seamless system or can overlap as desired by developers or administrators of the selection system 100.

The units 120, 130, and 140 of the selection system 100 can be in communication with one another for operation of the selection system 100. The query unit 120 can present to a user two or more prompts related to disability insurance. For each prompt, the query unit 120 can provide two or more response choices from which the user can choose. The user can select his or her desired response choices, which can be received by the query unit 120. The scoring unit 130 can be in communication with the query unit 120 and can calculate a response score based on the user's responses to the prompts. Each response choice associated with the presented prompts can be assigned a point value, and the scoring unit 130 can combine the point values of the selected responses to arrive at the response score. In an exemplary embodiment, for example, the scoring unit 130 can calculate the response score as the sum of the point values corresponding to the selected response choices. The recommendation unit 140 can be in communication with the scoring unit 130 and can recommend a disability insurance package to the user based on the user's responses to the prompts. The recommendation unit 140 can receive the response score from the scoring unit 130, and can select one of a plurality of available disability insurance packages as the recommended insurance package, based on the response score. Accordingly, the query unit 120, the scoring unit, and the recommendation unit can operate in conjunction with one another to select and recommend an appropriate disability insurance package for the user.

Figure 2:
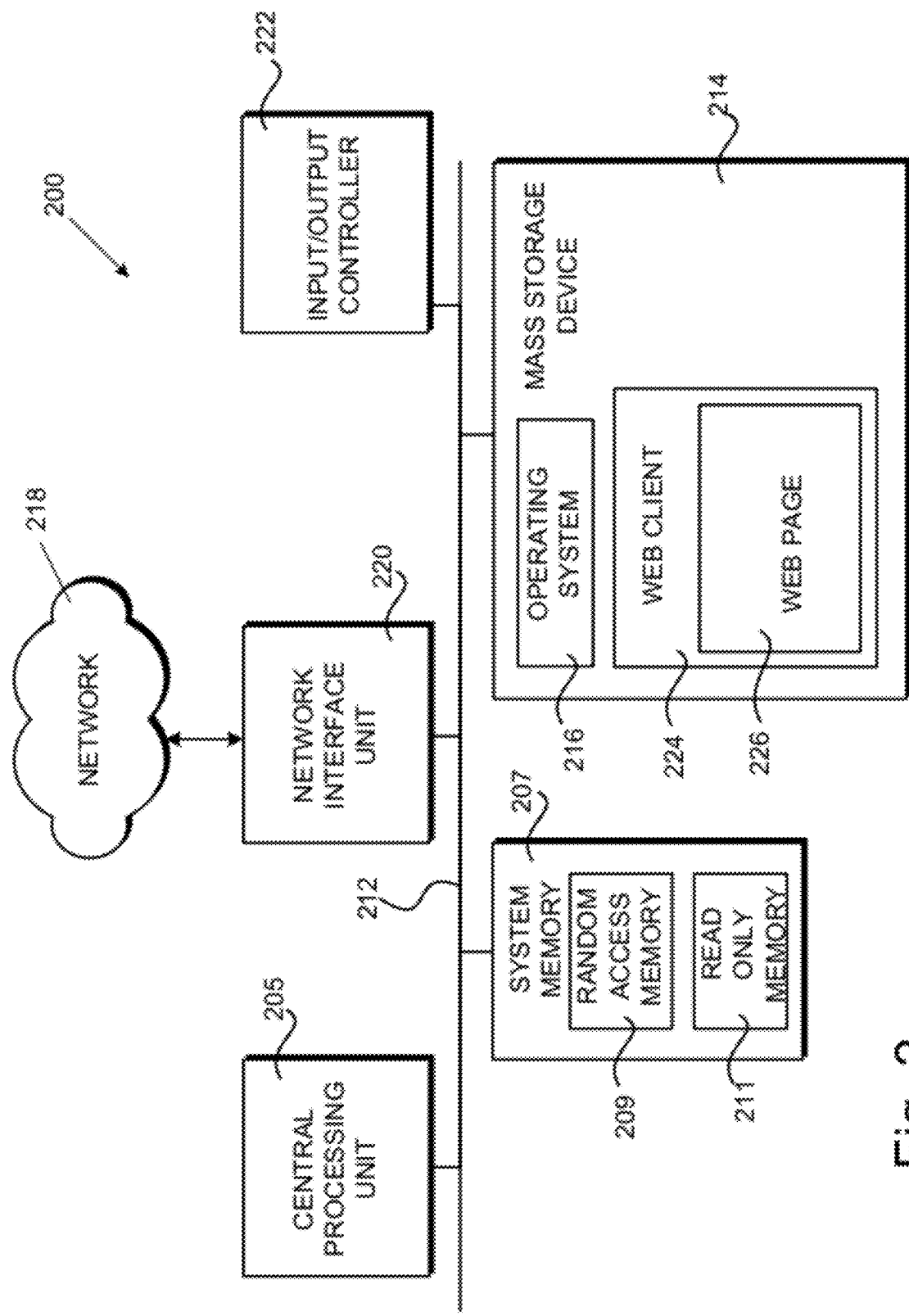
FIG. 2 illustrates a computer architecture for computing device configured to implement the selection system, according to an exemplary embodiment of the present invention.

FIG. 2 illustrates a computer architecture for a computing device 200 configured to implement a selection system 100, according to an exemplary embodiment of the present invention. Those skilled in the art will recognize that the general architecture described with reference to FIG. 2 is provided for example only, and can be modified to accommodate various embodiments and operational environments of the selection system 100.

As shown in FIG. 2, the computing device 200 can comprise a central processing unit 205 and one or more system memories 207, such as a random access memory 209 ("RAM") and a non-volatile memory, such as a read-only memory ("ROM") 211. The computing device 200 can further comprise a system bus 212 coupling together the memory 207, the processing unit 205, and various other components. A basic input/output system containing routines to assist in transferring information between components of the computing device 200 can be stored in the ROM 211. Additionally, the computing device 200 can include a mass storage device 214 for storing an operating system 216, application programs, and other program modules.

The mass storage device 214 can be connected to the processing unit 205 through a mass storage controller (not shown) connected to the bus 212. The mass storage device 214 and other computer-readable media can comprise computer storage media, which can include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or various other media used to store data accessible by the computing device 200.

A number of program modules and data files can be stored in the computer storage media and RAM 209 of the computing device 200. Such program modules and data files can include an operating system 216 suitable for controlling operations of a networked personal computer. A web browser application program, or web client 224, can also be stored on the computer storage media and RAM 209. The web client 224 may comprise an application program for requesting and rendering web pages 226 created in Hypertext Markup Language ("HTML") or other types of markup languages. The web client 224 can be capable of executing scripts through the use of a scripting host. The scripting host executes program code expressed as scripts within the browser environment.

Computer-readable instructions on the storage media of the computing device 200 can include, for example, instructions for implementing processes of the selection system 100 or for implementing a web client 224 for receiving instructions from the selection system 100 when operated remotely. These instructions can be executed by the processing unit 205 to enable use of the selection system 100. If a server 110 operates the selection system 100 remotely from the computing device 200 on which a user interface of the selection system 100 is displayed, then a processing unit 205 at the server 110 can execute instructions on computer storage media accessible by the server 110 for operating processes of the selection system 100.

The computing device 200 can operate in a networked environment using logical connections to remote computers, such as the server 110, over a network 50, such as the Internet. The computing device 200 can connect to the network 50, the server 110, and other remote computers through a network interface unit 220 connected to the bus 212.

The computing device 200 can also include an input/output controller 222 for receiving and processing input from a number of input devices, including a keyboard, mouse, or electronic stylus. Interactions between the input devices and a user interface of the selection system 100 can be detected by the input/output controller 222 to interpret input to the selection system 100. The input/output controller 222 can additionally provide output, which can be displayed on the user interface of the selection system 100 and which can provide one or more prompts and response choices of the selection system 100. The output can be provided to a display screen, a printer, or other type of output device.

FIG. 3 illustrates an earnings table 300 depicting approximate expected earned income for the remainder of possible clients' lives. As shown in the table 300, each row of the table 300 can represent a specified potential current age of the client, and each column of table 300 can represent a specified potential current annual earned income of the client. Each cell value of the table 300 can represent the approximate expected earned income, or human earnings value, of a client being of the age represented by the corresponding row and earning the annual income represented by the corresponding column. The human earnings values in the depicted table 300 are calculated based on a 4% compound annual salary increase, a 5% annual investment rate of return, and a 25% tax rate. Other salary increase, investment, and tax rates can alternatively be used if more appropriate.

Determining the client's human earnings value can help indicate a potential financial loss should the client become disabled and lose his or her earnings potential. Therefore, the earnings table 300 can be useful from an informational standpoint, as well as for determining the disability benefits that would be needed in the event that the client becomes disabled. Use of the table 300, or another table illustrating human earnings value, can vary based on desired operation of the selection system 100. For example, and not limitation, some embodiments of the selection system 100 can display the human earnings table 300 to the user merely to illustrate potential financial loss without disability insurance. Some embodiments of the selection system 100 do not display the entire table 300, but can utilize the table to select and display the specific human earnings value of the client. Some embodiments of the selection system 100 need not utilize a human earnings table 300 at all, but can calculate the human earnings value of the client on demand. In still other exemplary embodiments, however, the selection system 100 can select and recommend a disability insurance package without regard to the human earnings value of the client.

Figure 4:
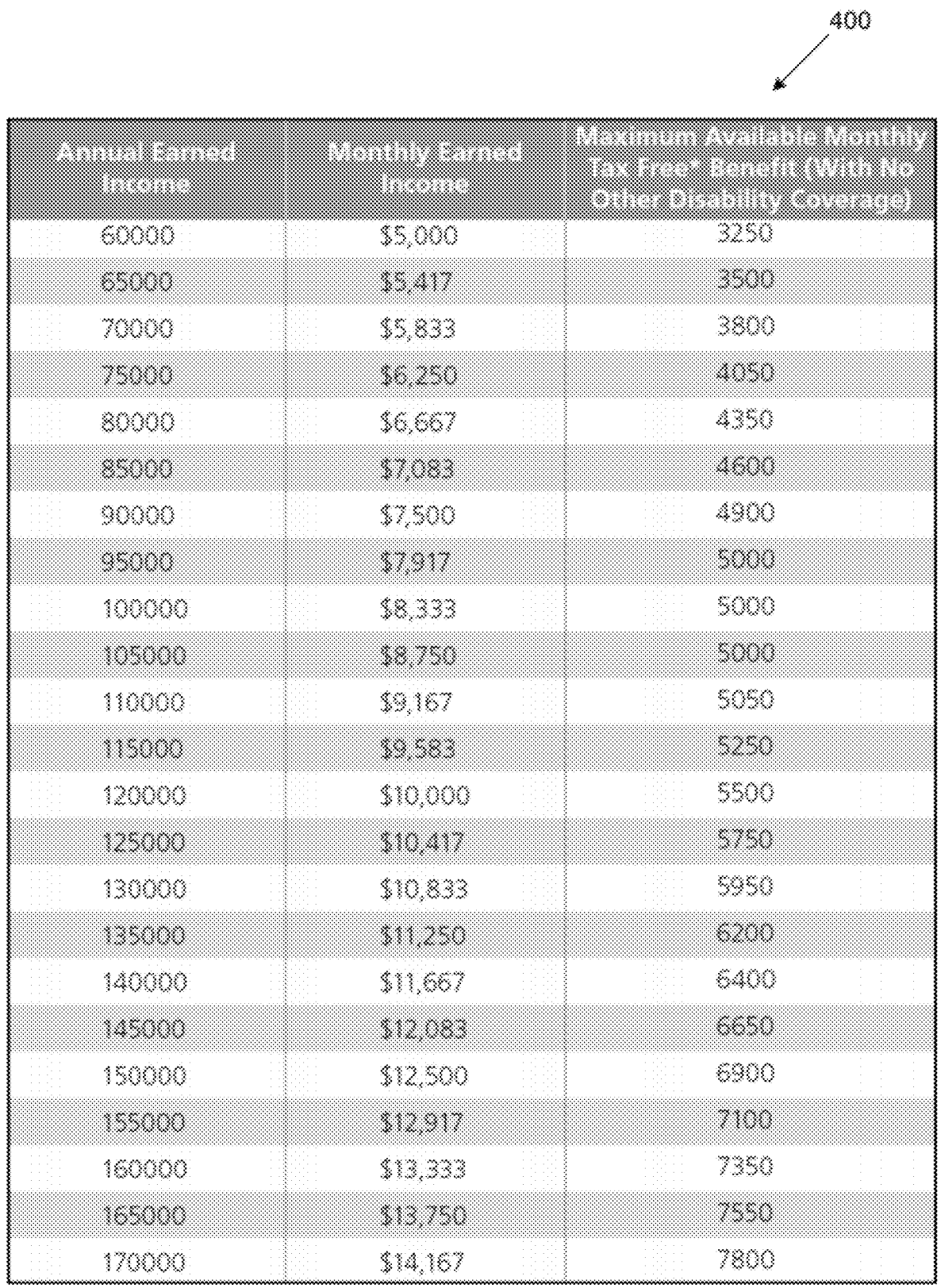
FIG. 4 illustrates a table depicting potential monthly benefits of disability insurance for the client, according to an exemplary embodiment of the present invention.

FIG. 4 illustrates a benefits table 400 depicting approximate monthly benefits for disability insurance, according to an exemplary embodiment of the present invention. Each row of the benefits table 400 can represent a specified annual income of a potential client. For each annual income represented by the rows, the benefits table 400 can provide a monthly earned income and a maximum benefit amount. The maximum benefit amount can be determined based on a combination of the annual income, policies of an insurance provider associated with the selection system 100, underwriting review, or other relevant factors. Like the earnings table 300, the benefits table 400 can be used by the selection system 100 in various manners. For example, the entire benefits table 400 can be displayed to the user for informational purposes, or only a select monthly benefit amount applicable to the client can be displayed to the user. Alternatively, the benefits table 400 need not be utilized at all, and the selection system 100 can calculate a monthly benefit amount on-demand or can provide a recommendation of disability insurance without regard to the monthly benefit amount.

FIG. 5 illustrates a form 500, questionnaire, or survey used for determining an appropriate recommendation of a disability insurance package for a client. For the purposes of this disclosure, the term "client" refers to a person for whom a disability insurance recommendation is sought, while the term "user" refers to a person utilizing the selection system 100 to determine an appropriate recommendation. The user and the client can, but need not, be the same person. For example, a client can access the selection system 100 directly to receive a recommendation, or a user can use the selection system 100 on behalf of the client. For example, the user can be an insurance agent assisting the client in identifying appropriate insurance coverage.

As shown in FIG. 5, a form 500 of the selection system 100 can comprise a predetermined set of prompts 520 and response choices 530 presented to a user for recommending a disability insurance package. The form 500 can be an electronic or paper form. In some exemplary embodiments, the form 500 is an electronic form presented to the user in a graphical user interface of the selection system 100. In that case, the user can read the prompts 520 from the graphical user interface and can select a response choice 530 through the graphical user interface. For example, to select a desired response choice 530, the user can utilize an input device to select the desired response choice 530, such as by positioning a mouse cursor of the desired response choice 530 and clicking a mouse button. When the user has completed the form 500, the user can submit his or her answer choices 530, such as by clicking a "save" or "submit" button. The query unit 120 can receive the user's selected response choices 530 through the graphical user interface, and the selection system 100 can store the selected response choices 530 for later use.

In some other embodiments, however, the form 500 can be a paper form, which can be filled out by a user with a physical writing instrument, such as a pen or pencil. In that case, the user can manually enter his or her response choices 530 into the query unit 120 after, or while, filling out the form 500, or the user can scan the form 500 into the computing device 200 to convert the selected response choices 530 into an electronic form readable by the query unit 120.

Each presented prompt 520 in the form 500 can relate to disability insurance and can have a corresponding set of predetermined response choices 530. The prompts 520 can relate to disability insurance and can be, for example, questions or statements designed for obtaining information about the client's needs or preferences related to disability insurance.

The specific prompts 520 presented to the user can depend on the disability insurance packages available for recommendation, and can further depend on how these available packages compare to one another. The selection system 100 can select a recommended insurance package from a predetermined set of two or more disability insurance packages. Because the disability insurance packages are predetermined, the prompts 520 can be directed toward narrowing down the field of possible recommendations. Preferably, each prompt 520 eliminates at least one of the available disability insurance packages from consideration or reduces the apparent preferability or advisability of at least one disability insurance package over another.

One or more prompts 520 can relate to an occupation of the client. For example, and not limitation, if one or more of the available disability insurance package are inappropriate, or particularly appropriate for clients in certain occupations, then providing a prompt 520 related to occupation can assist the selection system 100 in determined an appropriate disability insurance package recommendation. For further example, if only a single one of the available disability insurance packages is appropriate for a client in an occupation of physical labor, than providing that occupation information through a selected response choice 530 can immediately determine which disability insurance package to recommend. In that case, it is preferable to include a prompt 520 for obtaining information about the client's occupation.

One or more prompts 520 can relate to payment preferences of a client. Because the client will likely make premium payments to retain his or her disability insurance, the selected response choices 530 to prompts 520 related to payment preferences can guide the selection system 100 in determining which available disability insurance packages are most in line with the client's payment preferences. For example, some disability insurance packages may require increased premium payments over time. If the client's selected response choices 530 indicate that a flat payment amount is preferred or necessary, then the selection system 100 can determine that packages with increasing premiums are inappropriate or disfavored for the client.

The response choices 530 can reflect the client's possible feelings or beliefs related to the corresponding prompt 520. For example, if a particular prompt 520 is presented in the form of a statement, the response choices 530 can be "true" and "false," "agree" and "disagree," or the like. On the other hand, if a particular prompt 520 is presented in the form of a question, then the response choices 530 can be potential answers to the question. In some embodiments, a set of response choices 530 corresponding to a particular prompt 520 can include a response choice 530 for those clients who are on the fence or unsure about how to respond to the prompt 520. For example, as shown in FIG. 5, in addition to "agree" and "disagree," the response choices 530 can also include "unsure," "neither agree nor disagree," "none of the above," or the like.

In some exemplary embodiments, the response choices 530 for each prompt 520 can be mutually exclusive, such that only a single one of each group of response choices 530 corresponding to a particular prompt 520 applies to each client. The response choices 530 can also be comprehensive, such that at least one of the response choices 530 applies to each client. For example, a set of response choices 530 that include only "true," "false," and "neither true nor false" would be a set of response choices 530 that are both mutually exclusive and comprehensive. When the response choices 530 are both mutually-exclusive and comprehensive, one and only one of the response choices 530 applies to each client. Regardless of whether the response choices 530 are comprehensive or mutually-exclusive, however, a client may be unsure as to which response choice 530 applies. As a result, the disability insurance recommendation provided can only be as good a recommendation as permitted based on the client's knowledge of his or her own circumstances.

As mentioned above, the scoring unit 130 can calculate a response score for the client's selected response choices 530, and the recommendation unit 140 can recommend a disability insurance package based on the client's response score. The scoring unit 130 can calculate the client's total response score by associating each selected response choice 530 with a point value and then combining the point values of one or more, and preferably all, of the selected response choices 530. For each prompt 520 presented to the user, each of the corresponding response choices 530 can be associated with a point value. In an exemplary embodiment, not all response choices 530 corresponding to a particular prompt 520 have the same point value, such that the point value resulting from a prompt 520 is not fixed but can vary based on the client's selected response choice 530.

Figure 6:
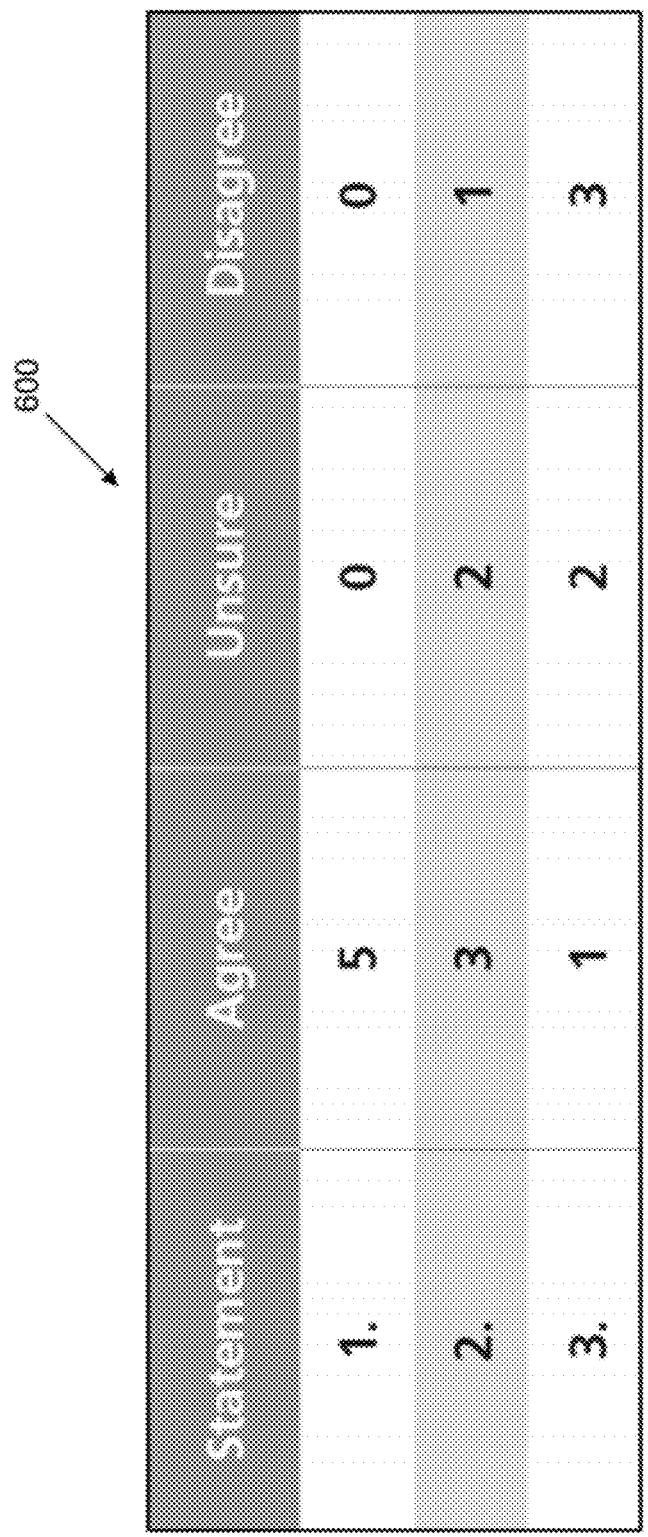
FIG. 6 illustrates a table of point values associated with the prompts presented to the client, according to an exemplary embodiment of the present invention.

FIG. 6 illustrates a points table 600 showing exemplary point values associated with the prompts 520 and response choices 530 depicted in FIG. 5. As shown in FIG. 6, for the first prompt 520 of FIG. 5, the response choices 530 "agree," "unsure," and "disagree" can have respective point values of five, zero, and zero. For the second prompt 520, "agree," "unsure," and "disagree" have respective point values of three, two, and one. Finally, for the third prompt 520, "agree," "unsure," and "disagree" have respective point values of one, two, and three.

Other point values can be selected based on the specific prompts 520 presented and the available disability insurance packages. The points table 600 depicts a single exemplary allocation of point values to the response choices 530 illustrated in FIG. 5. The allocation of point values used by an embodiment of the selection system 100 need not coincide with those depicted in the point stable of FIG. 6 but can be determined to achieve an appropriate recommendation of a disability insurance package based on the preferences or requirements of the client, as indicated by the client's selected response choices 530.

The scoring unit 130 can combine the point values of the selected response choices 530 in various manners. For example, and not limitation, the scoring unit 130 can calculate the response score as the sum of all of these point value. Alternatively, to weight some answers more than others, for example, a point value of one or more of the selected response choices 530 can be multiplied by a significance factor before being combined with the point values of other selected response choices 530. This can result in the response score being a linear combination of the point values associated with the selected response choices 530.

The scoring unit 130 can be in communication with the recommendation unit 140 to provide the recommendation unit 140 with the response score. Based on the response score, the recommendation unit 140 can select at least one of the available disability insurance packages and can recommend the selected package for the client.

Figure 7:
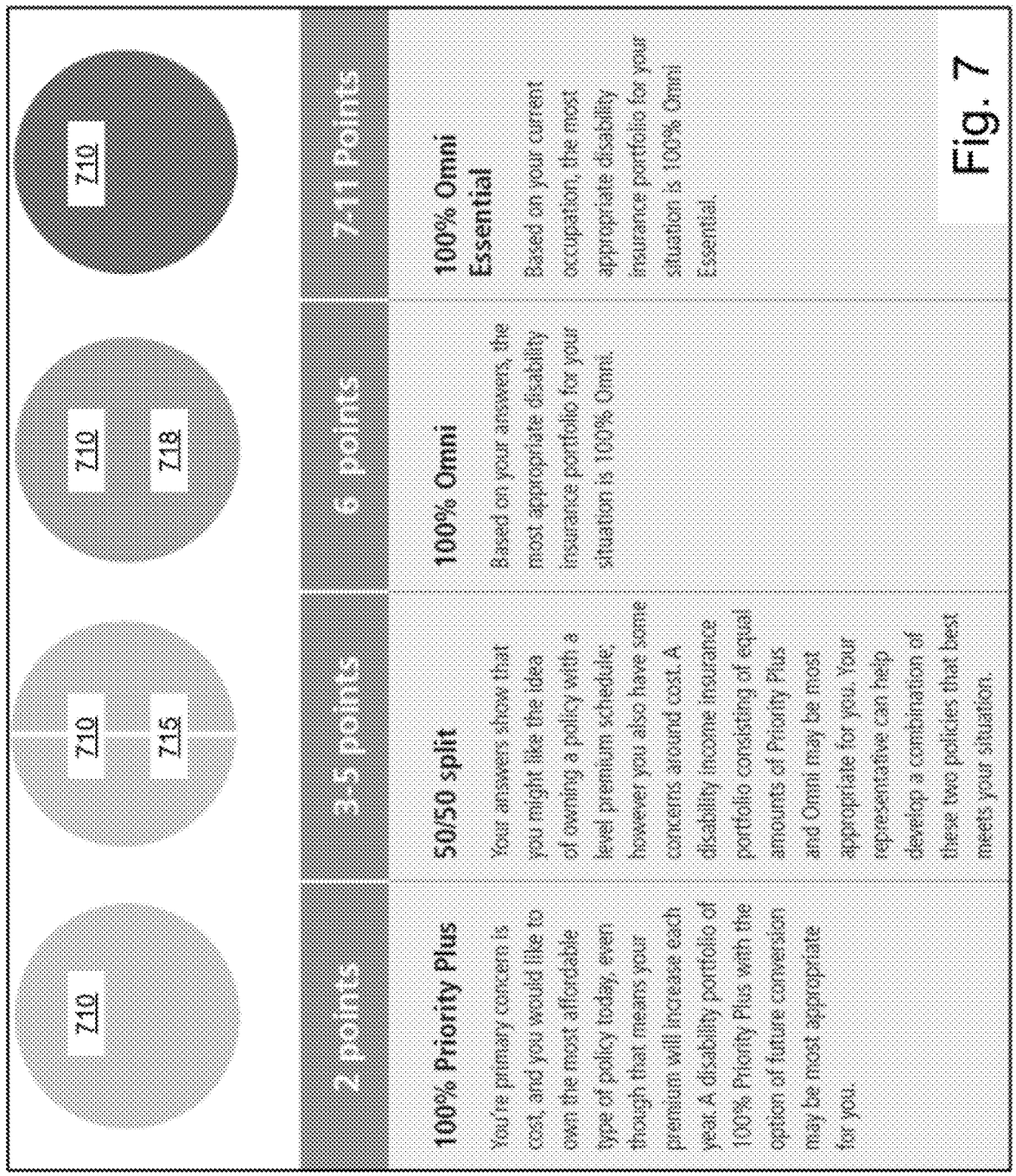
FIG. 7 illustrates a plurality of disability insurance packages that can be recommended based on the client's responses to the prompts, according to an exemplary embodiment of the present invention.

FIG. 7 illustrates a plurality of exemplary available disability insurance packages 710 that can be recommended based on the client's responses to the prompts 520. The available insurance packages 710 depicted in FIG. 7 are presented for illustrative purposes only and do not limit the type or quantity of insurance packages 710 that can be made available for recommendation through the selection system 100.

As exemplified by the second disability insurance package 715 depicted in FIG. 7, a disability insurance package 710 need not comprise only a single type of disability insurance but can be a combination of disability insurance types. A disability insurance package 710 can comprise, for example, a single type of disability insurance policy, a predetermined allocation of various types of disability insurance, or a combination of various specified disability insurance policies in an unspecified allocation. In the last case, an insurance agent can determine an appropriate allocation of the specified disability insurance policies after further consultation with the client, or the selection system 100 can present one or more additional prompts 520 to provide a more refined recommendation.

As shown in FIG. 7, each available disability insurance package 710 can be associated with a range of score values. A score value range for a disability insurance package 710 can include a single score value or a range of multiple score values. In an exemplary embodiment, there is no overlap between the score value ranges corresponding to the available disability insurance packages 710. The recommendation unit 140 of the selection system 100 can select for the client the disability insurance package 710 corresponding to the client's response score, such the client's response score falls into the score value range corresponding to the selected disability insurance package 710. The selection system 100 can then output an indication of the selected disability insurance package 710 as a recommendation for the client.

After selecting a disability insurance package 710 for recommendation, the selection system 100 can present one or more rider options that can be added to the recommended disability insurance package 710 to further customize the package. The rider options can include, for example, one or more of the following: an option for benefit increases while the insured is not disabled; an option for benefit increases based on a cost of living adjustment; an option to receive additional benefits for catastrophic disability; an option to receive the full disability benefit when a disability prohibits employment in the insured's regular occupation, despite employment in a different occupation; an option to receive a portion of the disability benefit when a predetermined percentage of income is lost due to disability, although the insured remains fully employed; an option to receive spousal catastrophic disability benefits; and an option to continue retirement fund contributions during a term of disability.

In some exemplary embodiments of the selection system 100, one or more additional prompts 520 can be presented to the user to further refine the recommendation as necessary. Whether and which additional prompts 520 are presented can depend on the recommended disability insurance package 710. For example, FIG. 8A illustrates an additional prompt 520 and response choices 530 that can be presented to the client should the client's response score result in a recommendation of the third disability insurance package 718. In this case, the third disability insurance package 718 is a disability insurance category, referred to in FIG. 7 as "Omni," requiring further refinement to determine a specific disability insurance type within the "Omni" category. FIG. 8B illustrates exemplary point values associated with the response choices 530 of FIG. 8A, while FIG. 8C illustrates refined recommendations based on the client's selected response choice 530 to the prompt 520 of FIG. 8A. As shown in FIG. 8B, the response choices 530 of "agree," "unsure," and "disagree" can be assigned respective point values of three, two, and one for the prompt 520 presented in FIG. 8A. As further shown by FIG. 8C, a selection of "unsure" or "disagree" as a response choice 530 can result in a refined recommendation of "Omni Essential," while selection of "agree" can result in a refined recommendation of "Omni Advantage."

Figure 9:
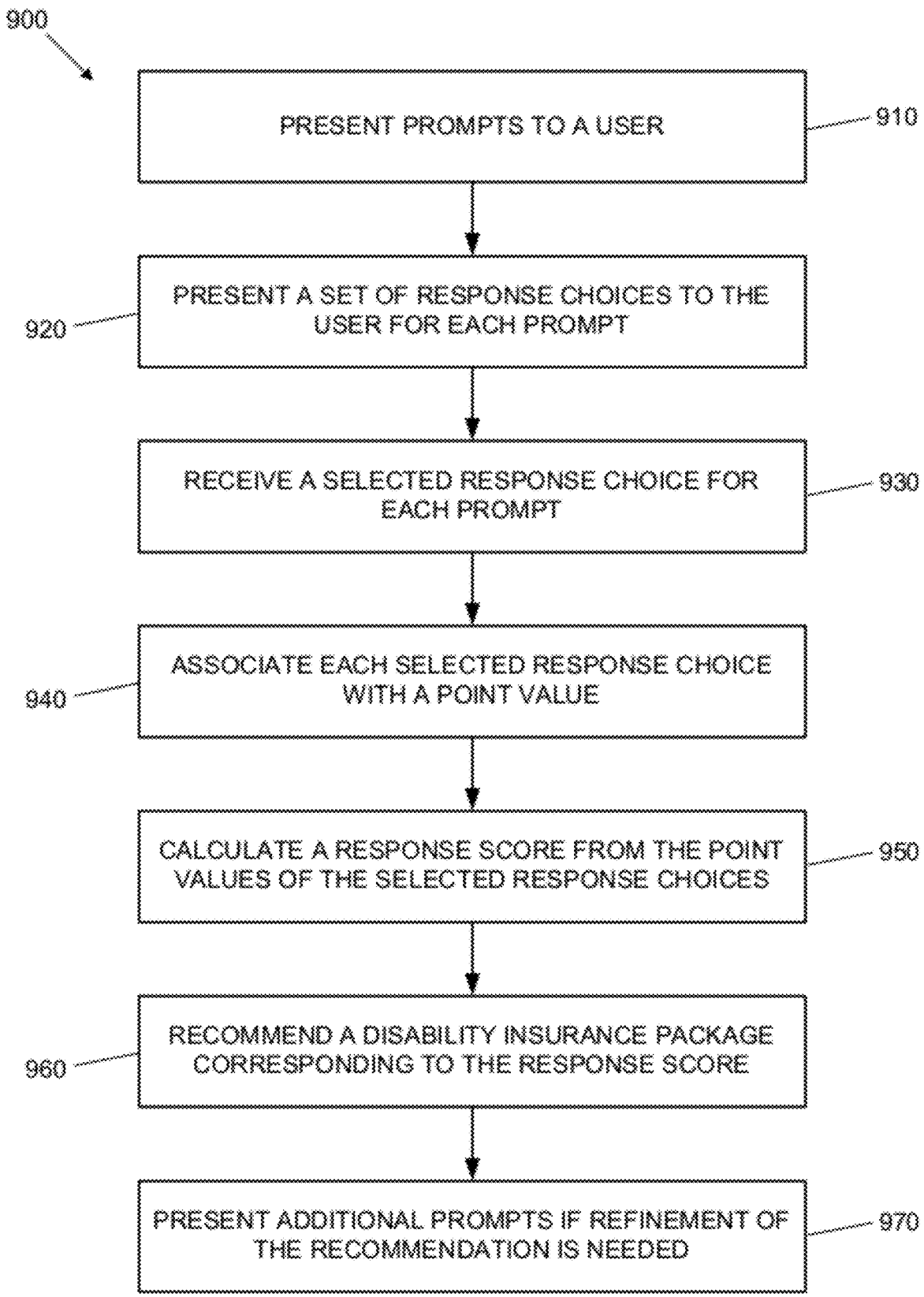
FIG. 9 illustrates a flow diagram of a method for recommending a disability insurance package, according to an exemplary embodiment of the present invention.

FIG. 9 illustrates a flow diagram of a method 900 for recommending a disability insurance package 710, according to an exemplary embodiment of the present invention. The method 900 of FIG. 9 is presented for illustrative purposes only, however, and does not limit the scope of the selection system 100, which can employ various methods to recommend a disability insurance package 710 in accordance with the present invention.

As shown in FIG. 9, at 910, one or more prompts 520 can be presented to the user, and the prompts 520 can be designed to reveal relevant information about the client's preferences for disability insurance. At 920, one or more sets of response choices 530 can be presented to the user, where each set of response choices 530 corresponds to a particular prompt 520. At 930, a selection of a response choice 530 for each prompt 520 can be received from the user, where each selected response choice 530 can belong to the set of response choices 530 corresponding to the applicable prompt 520. At 940, each selected response choice 530 can be associated with a point value. At 950, a response score can be calculated from one or more of the point values associated with the selected response choices 530. At 960, a disability insurance package 710 can be selected from available disability insurance packages 710, and the selected disability insurance package 710 can be recommended to the client. Finally, at 970, if further refinement of the recommendation is needed, additional prompts 520 and response choices 530 can be presented to the user and analyzed.

Accordingly, as described above, various embodiments of disability insurance selection systems 100 and methods 900 according to the present invention can select and recommend disability insurance packages 710 based on responses to prompts 520 presented by the selection system 100.

While various exemplary embodiments of selection systems 100 and methods 900 have been disclosed and illustrated in detail, many modifications, additions, and deletions can be made to the reporting systems without departing from the spirit and scope of the present invention and its equivalents, as set forth in the following claims.

What is claimed is:

1. A computer-implemented method for mapping user defined disability insurance parameters to a selection of recommended disability insurance, the method comprising:
 displaying a graphical user interface having web pages displayed in a web browser on a user's computer, the graphical user interface configured to:
 display a plurality of prompts to the user depending on disability insurance packages available for recommendation, including:
 a first prompt related to the user's occupation; and
 a second prompt related to the user's preference to pay a flat amount or an increased premium amount over time, wherein each prompt eliminates at least one of the disability insurance packages from consideration;

display a plurality of predefined responses to each prompt to be selected by the user, the plurality of predefined response to each prompt indicating whether the user agrees, is neutral to and disagrees with a statement in the prompt, each predefined response of the first prompt being assigned with a different point value, each predefined response of the second prompt being assigned with a different point value;

receive the user's selected predefined response to each of the first and second prompts;

display a recommended disability insurance package based on an aggregated response score calculated by combining point values of the user's selected predefined responses to the first and second prompts, the recommended disability insurance package including a combination of disability insurance policies in an unspecified allocation, the recommended disability insurance package including a disability insurance category, the disability insurance category including a plurality of disability insurance types;

display a third prompt related to the user's preference for an allocation of the disability insurance policies within the recommended disability insurance package;

automatically determine an appropriate allocation of the disability insurance policies within the recommenced disability insurance package after receiving the user's response to the third prompt;

display a fourth prompt related to the user's preference regarding any change of policy premium;

display a plurality of predefined responses to the fourth prompt to be selected by the user, the plurality of predefined response to the third prompt indicating whether the user agrees, is neutral to and disagrees with a statement in the third prompt, each predefined response of the third prompt being assigned with a different point value;

receive the user's selected predefined response to the fourth prompt;

select a recommended disability insurance type from the plurality of disability insurance types of the recommended disability insurance package based on the point value of the user's selected predefined response to the fourth prompt;

display the recommended disability insurance type to the user; and display a plurality of rider options to be added to the recommended disability insurance package for the user's selection;

parsing, by a computer processor, from a stored lookup table of selectable values, the point value for each selected predefined response; and determining, by the computer processor, the aggregated response score based on the point values of the user's selected predefined responses.

2. The method of claim 1, wherein the computer processor determines the aggregated response score by calculating a sum of the point values corresponding to the selected predefined responses.

3. The method of claim 1, wherein the predefined responses to the prompts include "true", "false", "agree" and "disagree".

4. The method of claim 1, the recommended disability insurance package includes two or more types of disability insurance.

5. The method of claim 1, wherein the graphical user interface displays a first additional prompt for user input related to at least one of expected salary increase and investment and tax rate, and displays a second additional prompt related to an expected human earnings value based on the user input in responses to the first additional prompt.

6. The method of claim 5, further comprising determining, by the computer processor, an amount of disability insurance coverage based on the human earnings value of the user.

7. The method of claim 1, wherein the computer processor selects the recommended disability insurance package by:

associating each disability insurance package with a package score value; and comparing the package score value to the aggregated response score.

8. A system for mapping user defined disability insurance parameters to a selection of recommended disability insurance, the system comprising:

a graphical user interface having web pages displayed in a web browser on a user's computer, the graphical user interface configured to:

display a plurality of prompts to the user depending on disability insurance packages available for recommendation, including:

a first prompt related to the user's occupation; and a second prompt related to the user's preference to pay a flat amount or an increased premium amount over time, wherein each prompt eliminates at least one of the disability insurance packages from consideration;

display a plurality of predefined responses to each prompt to be selected by the user, the plurality of predefined response to each prompt indicating whether the user agrees, is neutral to and disagrees with a statement in the prompt, each predefined response of the first prompt being assigned with a different point value, each predefined response of the second prompt being assigned with a different point value;

receive the user's selected predefined response to each of the first and second prompts;

display a recommended disability insurance package based on an aggregated response score calculated by combining point values of the user's selected predefined responses to the first and second prompts, the recommended disability insurance package including a combination of disability insurance policies in an unspecified allocation, the recommended disability insurance package including a disability insurance category, the disability insurance category including a plurality of disability insurance types;

display a third prompt related to the user's preference for an allocation of the disability insurance policies within the recommended disability insurance package;

automatically determine an appropriate allocation of the disability insurance policies within the recommenced disability insurance package after receiving the user's response to the third prompt;

display a fourth prompt related to the user's preference regarding any change of policy premium;

display a plurality of predefined responses to the fourth prompt to be selected by the user, the plurality of predefined response to the third prompt indicating whether the user agrees, is neutral to and disagrees with a statement in the third prompt, each predefined response of the third prompt being assigned with a different point value;

receive the user's selected predefined response to the fourth prompt;

select a recommended disability insurance type from the plurality of disability insurance types of the recommended disability insurance package based on the point value of the user's selected predefined response to the fourth prompt;

display the recommended disability insurance type to the user; and display a plurality of rider options to be added to the recommended disability insurance package for the user's selection;

a scoring unit for calculating the aggregated response score, with a computer processor, by parsing from a first stored lookup table of selectable values, the point value for each of the selected predefined responses to the prompts; and determining the aggregated response score based on the point values of the user's selected predefined responses; and a recommendation unit for mapping the aggregated response score to the recommended disability insurance package stored in a second lookup table of aggregated point value ranges, wherein said second lookup table associates possible disability insurance packages to each possible aggregated point value range.

9. The system of claim 8, the recommended disability insurance package includes two or more types of disability insurance.

10. The system of claim 8, wherein the recommendation unit is configured to:

associate each of the plurality of available disability insurance packages with a package score value, and compare each package score value to the aggregated response score.

11. A computer-implemented method for mapping user defined disability insurance parameters to a selection of recommended disability insurance, the method comprising:

displaying a graphical user interface having web pages displayed in a web browser on a user's computer, the graphical user interface configured to:

display a plurality of prompts to the user depending on disability insurance packages available for recommendation, including:

a first prompt related to the user's occupation; and a second prompt related to the user's preference to pay a flat amount or an increased premium amount over time, wherein each prompt eliminates at least one of the disability insurance packages from consideration;

display a plurality of predefined responses to each prompt to be selected by the user, the plurality of predefined response to each prompt indicating whether the user agrees, is neutral to and disagrees with a statement in the prompt, each predefined response of the first prompt being assigned with a different point value, each predefined response of the second prompt being assigned with a different point value;

receive the user's selected predefined response to each of the first and second prompts;

display a recommended disability insurance package based on an aggregated response score calculated by combining point values of the user's selected predefined responses to the first and second prompts, the recommended disability insurance package including a combination of disability insurance policies in an unspecified allocation, the recommended disability insurance package including a disability insurance category, the disability insurance category including a plurality of disability insurance types;

display a third prompt related to the user's preference for an allocation of the disability insurance policies within the recommended disability insurance package;

automatically determine an appropriate allocation of the disability insurance policies within the recommenced disability insurance package after receiving the user's response to the third prompt;

display a fourth prompt related to the user's preference regarding any change of policy premium;

display a plurality of predefined responses to the fourth prompt to be selected by the user, the plurality of predefined response to the third prompt indicating whether the user agrees, is neutral to and disagrees with a statement in the third prompt, each predefined response of the third prompt being assigned with a different point value;

receive the user's selected predefined response to the fourth prompt;

select a recommended disability insurance type from the plurality of disability insurance types of the recommended disability insurance package based on the point value of the user's selected predefined response to the fourth prompt;

display the recommended disability insurance type to the user; and display a plurality of rider options to be added to the recommended disability insurance package for the user's selection;

parsing, by a computer processor, from a first stored lookup table of selectable values, the point value for each of the selected predefined responses to the prompts, determining, by the computer processor, the aggregated response score based on the point values of the user's selected predefined responses.

* * * * *